United States Patent
Bitar et al.

(10) Patent No.: US 12,544,985 B2
(45) Date of Patent: Feb. 10, 2026

(54) METHOD FOR SETTING A DROP SHAPE IN A PRINTING PROCESS

(71) Applicant: Ivoclar Vivadent AG, Schaan (LI)

(72) Inventors: Nicola Bitar, Montlingen (CH); Jonas Reinhardt, Igis (CH); Christian Niedrig, Azmoos (CH); Johannes Renner, Ostermundigen (CH)

(73) Assignee: Ivoclar Vivadent AG, Schaan (LI)

( * ) Notice: Subject to any disclaimer, the term of this patent is extended or adjusted under 35 U.S.C. 154(b) by 167 days.

(21) Appl. No.: 18/599,121

(22) Filed: Mar. 7, 2024

(65) Prior Publication Data

US 2024/0308143 A1  Sep. 19, 2024

(30) Foreign Application Priority Data

Mar. 14, 2023  (EP) .................................... 23161781

(51) Int. Cl.
*B41J 2/045* (2006.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/393; B29C 64/112; B29C 64/209; B33Y 10/00; B33Y 30/00; B41J 2/04501; B41J 2/04581; B41J 2/04588; B41J 2/04516; B41J 2/045; B41J 2/0459; B41J 2/04555; B41J 2/04591; B41J 2/04503; B41J 2/04505; B41J 2/04506; B41J 2/04508; B41J 2/0451; B41J 2/04513; B41J 2/04515; B41J 2/04518; B41J 2/0452; B41J 2/04521; B41J 2/04525; B41J 2/04526; B41J 2/04535; B41J 2/04536; B41J 2/04553; B41J 2/04558; B41J 2/0456; B41J 2/04561; B41J 2/04563; B41J 2/04565; B41J 2/04566; B41J 2/04568;
(Continued)

(56) References Cited

U.S. PATENT DOCUMENTS 5,646,654 A  7/1997 Widder
6,926,388 B2  8/2005 Gröninger et al.
(Continued)

FOREIGN PATENT DOCUMENTS

CN  113557143  * 10/2021  .......... B41J 2/04581

*Primary Examiner* — Kristal Feggins
(74) *Attorney, Agent, or Firm* — Ann M. Knab; Thad McMurray

(57) ABSTRACT

A method for setting a drop shape in a printing process, including the steps of controlling (S101) a piezo element of a printing nozzle by a first voltage profile; detecting (S102) an electric current value averaged over the first voltage profile or a sound amplitude averaged over the first voltage profile; controlling (S103) the piezo element of the printing nozzle by a second voltage profile; detecting (S104) an electric current value averaged over the second voltage profile or a sound amplitude averaged over the second voltage profile; and selecting (S105) the voltage profile with the lower detected current value or the lower detected sound amplitude.

15 Claims, 8 Drawing Sheets

(51) Int. Cl.
*B29C 64/209* (2017.01)
*B29C 64/393* (2017.01)
*B33Y 10/00* (2015.01)
*B33Y 30/00* (2015.01)

(52) U.S. Cl.
CPC ............. *B33Y 10/00* (2014.12); *B33Y 30/00* (2014.12); *B41J 2/04501* (2013.01); *B41J 2/04581* (2013.01); *B41J 2/04588* (2013.01)

(58) Field of Classification Search
CPC .. B41J 2/0457; B41J 2/04571; B41J 2/04573; B41J 2/195; B41J 2/2135; B41J 2/2139; B41J 2/2142; B41J 2/2146; B41J 2/512; B41J 11/42; B41J 19/145; B41J 2/04538; B41J 2/0454
See application file for complete search history.

(56) References Cited

U.S. PATENT DOCUMENTS

| | | |
|---|---|---|
| 8,814,299 B2 | 8/2014 | Tanaka et al. |
| 9,079,391 B2 | 7/2015 | Kaneko et al. |
| 10,189,246 B2 | 1/2019 | Venner et al. |
| 2001/0028371 A1 | 10/2001 | Su et al. |
| 2004/0017412 A1 | 1/2004 | Groninger et al. |
| 2013/0083107 A1* | 4/2013 | Nishikawa ............. B41J 2/0451 347/10 |
| 2013/0321507 A1 | 12/2013 | Mardilovich et al. |
| 2018/0370227 A1* | 12/2018 | Hayashi .................. B41J 13/00 |

\* cited by examiner

METHOD FOR SETTING A DROP SHAPE IN A PRINTING PROCESS

CROSS-REFERENCE TO RELATED APPLICATIONS

This application claims priority to EP 23161781.2, filed on Mar. 14, 2023, the disclosure of which is incorporated herein by reference in its entirety.

TECHNICAL FIELD

The present invention relates to a method for setting a drop shape in a printing process and a printing device for carrying out the method.

BACKGROUND

U.S. Pat. Nos. 5,646,654, 6,926,388, 8,814,299, 9,079,391, 10,189,246, 20010028371, 20040017412 and 20130321507 are directed to ink jet and printing technology and are hereby incorporated by reference in their entirety.

SUMMARY

It is the technical task of the present invention to set the drop shape of a printing liquid in a printing process in such a way that the printing process can be carried out precisely and efficiently.

This task is solved by subject matter according to the independent claims. Technically advantageous embodiments are the subject of the dependent claims, the description and the drawings.

According to a first aspect, the technical task is solved by a method for setting a drop shape in a printing process, comprising the steps of controlling a piezo element of a printing nozzle by a first voltage profile; detecting an electric current value averaged over the first voltage profile or a sound amplitude averaged over the first voltage profile; controlling the piezo element of the printing nozzle by a second voltage profile; detecting an electric current value averaged over the second voltage profile or a sound amplitude averaged over the second voltage profile; and selecting the voltage profile having the lower detected current value or the lower detected sound amplitude. The method can achieve automatic tuning of the voltage profile for optimal drop shape. Independent autotuning of a print head is made possible. Complex devices for determining a drop shape of the ejected printing liquid can be dispensed with. In addition, the time required to set the drop shape is reduced.

In a technically advantageous embodiment of the method, the second voltage profile is determined on the basis of the first voltage profile. This provides the technical advantage, for example, that the second voltage profile can be generated in a simple manner.

In a further technically advantageous embodiment of the method, the second voltage profile is generated by decreasing or increasing a rise time of the first voltage profile. This provides the technical advantage, for example, that a local minimum for the current value or the sound amplitude can be found which indicates a suitable rise time.

In a further technically advantageous embodiment of the method, the second voltage profile is generated by decreasing or increasing a fall time of the first voltage profile. This provides the technical advantage, for example, that a local minimum for the current value or the sound amplitude can be found that indicates a suitable fall time.

In a further technically advantageous embodiment of the method, the second voltage profile is generated by decreasing or increasing a hold time of the first voltage profile. This provides the technical advantage, for example, that a local minimum for the current value or the sound amplitude can be found that indicates a suitable hold time.

In a further technically advantageous embodiment of the method, the second voltage profile is generated by decreasing or increasing a holding voltage of the first voltage profile. This provides the technical advantage, for example, that a local minimum for the current value or the sound amplitude can be found that indicates a suitable holding voltage.

In a further technically advantageous embodiment of the method, the second voltage profile is generated by keeping a holding voltage of the first voltage profile unchanged. This provides the technical advantage, for example, that the parameter space for the voltage profile is reduced and the voltage profile can be determined with less effort.

In a further technically advantageous embodiment of the method, the second voltage profile is generated by keeping a hold time of the first voltage profile unchanged. This also provides the technical advantage, for example, that the parameter space for the voltage profile is reduced and the voltage profile can be determined with less effort.

In a further technically advantageous embodiment of the method, the first voltage profile is a predetermined voltage profile. This provides the technical advantage, for example, that the method can be started from a predetermined and particularly suitable voltage profile.

In a further technically advantageous embodiment of the method, a plurality of predetermined voltage profiles is stored. This provides the technical advantage, for example, that different voltage profiles can be used for different printing liquids.

In a further technically advantageous embodiment of the method, the first and/or second voltage profile is selected from the plurality of predetermined voltage profiles. This provides the technical advantage, for example, that a voltage profile can be selected depending on the printing liquid. By using suitable voltage profiles depending on the printing liquid, the method can converge and be carried out more quickly.

In a further technically advantageous embodiment of the method, the method is carried out when the printing liquid in the print head or printing system is changed or when a predetermined time has elapsed. This provides the technical advantage, for example, that when the printing liquid is changed, a suitable voltage profile for setting the liquid drops is automatically obtained or aging of the print head and its components can be compensated for. In addition, the voltage profiles can be adapted to rheological changes in the printing liquid, such as temperature fluctuations in the environment or heating of the system during operation.

In a further technically advantageous embodiment of the method, the method is a three-dimensional printing method for building up a spatial object. This provides the technical advantage, for example, of obtaining particularly suitable voltage profiles for printing liquids that are used to build up the spatial object layer by layer.

In a further technically advantageous embodiment of the method, the print head is covered by a closure plate. This provides the technical advantage, for example, that no printing liquid is wasted during the method.

According to a second aspect, the technical task is solved by a printing device configured to perform the method according to the first aspect. The printing device achieves the same technical advantages as the method according to the first aspect.

BRIEF DESCRIPTION OF THE DRAWINGS

Exemplary embodiments of the invention are shown in the drawings and are described in more detail below, in which.

DETAILED DESCRIPTION

Figure 1:
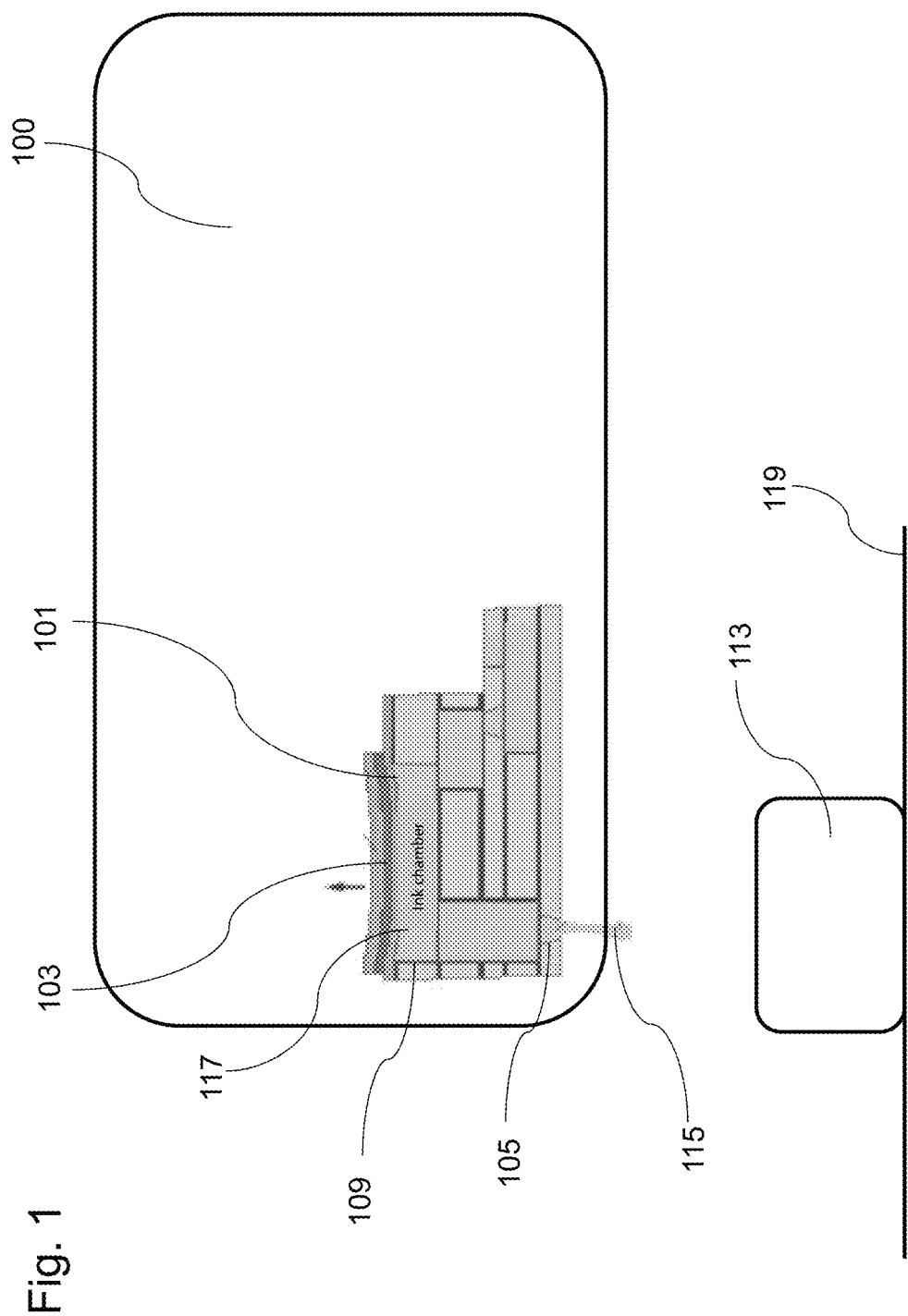
FIG. 1 shows a schematic cross-sectional view of a print head.

FIG. 1 shows a schematic cross-sectional view of a controllable print head 109 of a printing device 100. The printing device 100 uses a jet of liquid drops 115 for a printing process (inkjet process). The printing process may be a two-dimensional printing process for creating images by applying ink, or a three-dimensional printing process for creating spatial objects 113 created by a printing liquid 101 accumulating layer by layer on a building platform 119.

For ejecting the printing liquid 101, at least one piezo element 103 is installed in the print head 109 of the printing device 100, which converts an electric voltage pulse into a movement and transmits it to the printing liquid 101 in the ink chamber 117. The movement of the piezo element 103 is achieved by the inverse piezoelectric effect, which causes the piezo element 103 to produce a downward movement (fall) when a negative voltage is applied and an upward movement (rise) when a positive voltage is applied.

A voltage profile is used to drive the piezo elements 103, which has different sections. Depending on the voltage profile and the printing liquid 101 used, differently configured liquid drops 115 are created.

Figure 2:
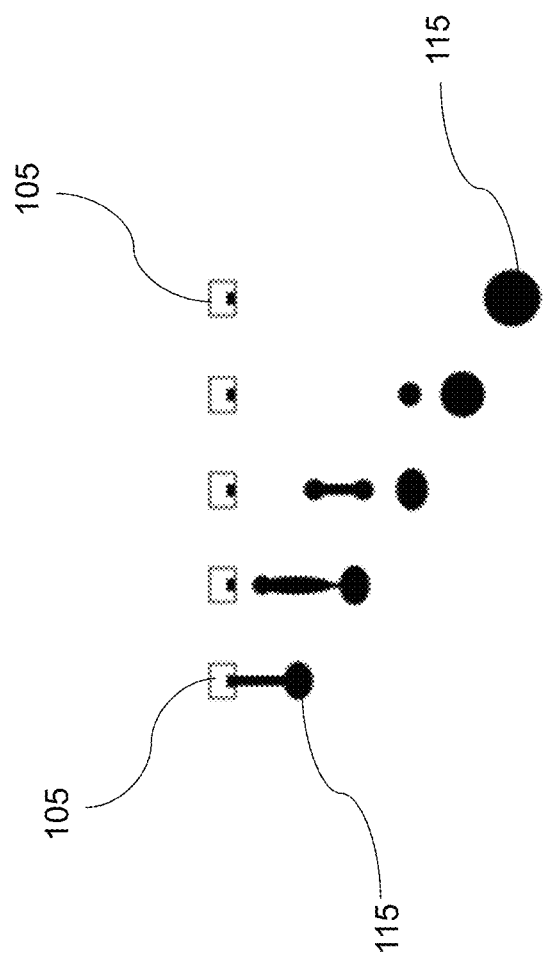
FIG. 2 shows a schematic view of different drops of a printing liquid.

FIG. 2 shows a schematic view of different liquid drops 115 of the printing liquid 101. The voltage profile 107 used should produce homogeneous liquid drops 115 without creating elongated drops, spray effects or satellite drops. Satellite drops are small liquid drops 115 next to the main drop (double drops) that deposit chaotically and degrade the printed image. Contamination of the printing liquid into the printed image or build-up material of the others should be avoided.

Ideally, the voltage profile 107 used will generate a single spherical liquid drop 115 moving at a predetermined speed, such as 4 to 9 m/s. To achieve this, the voltage profile 107 is adjusted accordingly (wave tuning).

Figure 3:
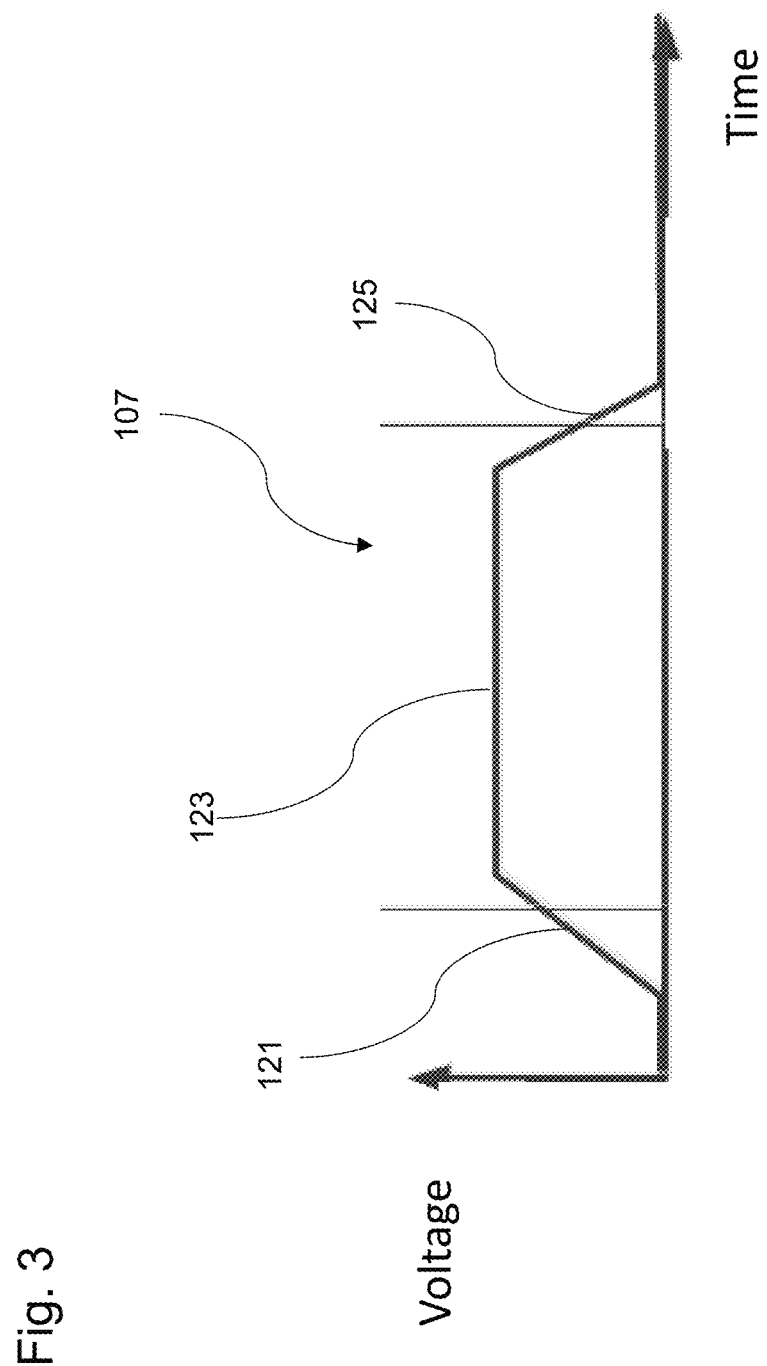
FIG. 3 shows a schematic view of a voltage profile for driving a piezo element.

FIG. 3 shows a schematic view of a trapezoidal voltage profile 107 for driving the piezo element 103. The voltage profile 107 is generated by an electronic control unit with an electric circuit and can be stored as a predetermined voltage profile 107 in the printing device 100. For this purpose, the data of the voltage profile 107 may be stored digitally in the control unit. The control unit may also store a plurality of predetermined voltage profiles 107, one of which is selected as the starting point for the method depending on the printing liquid used.

The voltage profile 107 comprises three sections, namely a first start section 121 with a fall time in which the electric voltage rises, a second hold section 123 with a waiting time in which the electric voltage is constant, and a third end section 125 with a rise time in which the electric voltage falls. To create a suitable drop shape, the respective sections 121, 123 and 125 are changed.

In the course of this, the fall time, waiting time and rise time of the respective sections 121, 123 and 125 are changed and adjusted. Since each printing liquid 101 is rheologically different, a correspondingly adjusted voltage profile 107 should be used for the printing process for each printing liquid 101.

The fall time generates a pulling motion of the piezo element 103. The start section 121 is composed of the fall time and a drop-out voltage. The drop-out voltage has an influence on the generated drop size, for example. If the drop voltage changes greatly, the speed of sound of the printing liquid 101 should not be exceeded.

The waiting time is the time at a constant voltage in the hold section 123 during which the printing liquid 101 relaxes. The relaxation is related to the speed of sound within the printing liquid 101. The end of the waiting time should coincide as closely as possible with the relaxation of the printing liquid 101 in the ink chamber 117 of the print head 109, so that at this time the rise time starts synchronously with the relaxation movement.

The rise time in the end section 125 generates a pushing motion of the piezo element 103. The motion of the printing liquid 101 generated by the fall time and the relaxation of the printing liquid 101 generated in the waiting time is further accelerated during the rise time, so that a drop of liquid 115 escapes from the ink chamber 117 through the printing nozzle 105.

The amplitude height is the height of the electric voltage during the waiting time and correlates with the size of the ejected liquid drop 115. When tuning the voltage profile 107, a constant predetermined voltage can be used as the amplitude height.

When tuning the voltage profile 107 (wave tuning), different voltage profiles 107 with different fall time, waiting time, rise time and amplitude height are generated. Then, for the individual voltage profiles 107, the electric current through the piezo element 103 is determined with an amperemeter or a suitable electrical circuit and averaged over the duration of the voltage profile 107, for example by integrating individual current values over time. The voltage profile 107 may be repeatedly applied to the piezo element 103 at a repetition frequency to average the electric current through the piezo element 103 during that duration.

Instead of the electric current through the piezo element 103, the sound amplitude generated by the piezo element 103 can also be used. The electric current or sound amplitude values thus detected are then used to select one of the generated voltage profiles 107.

Figure 4:
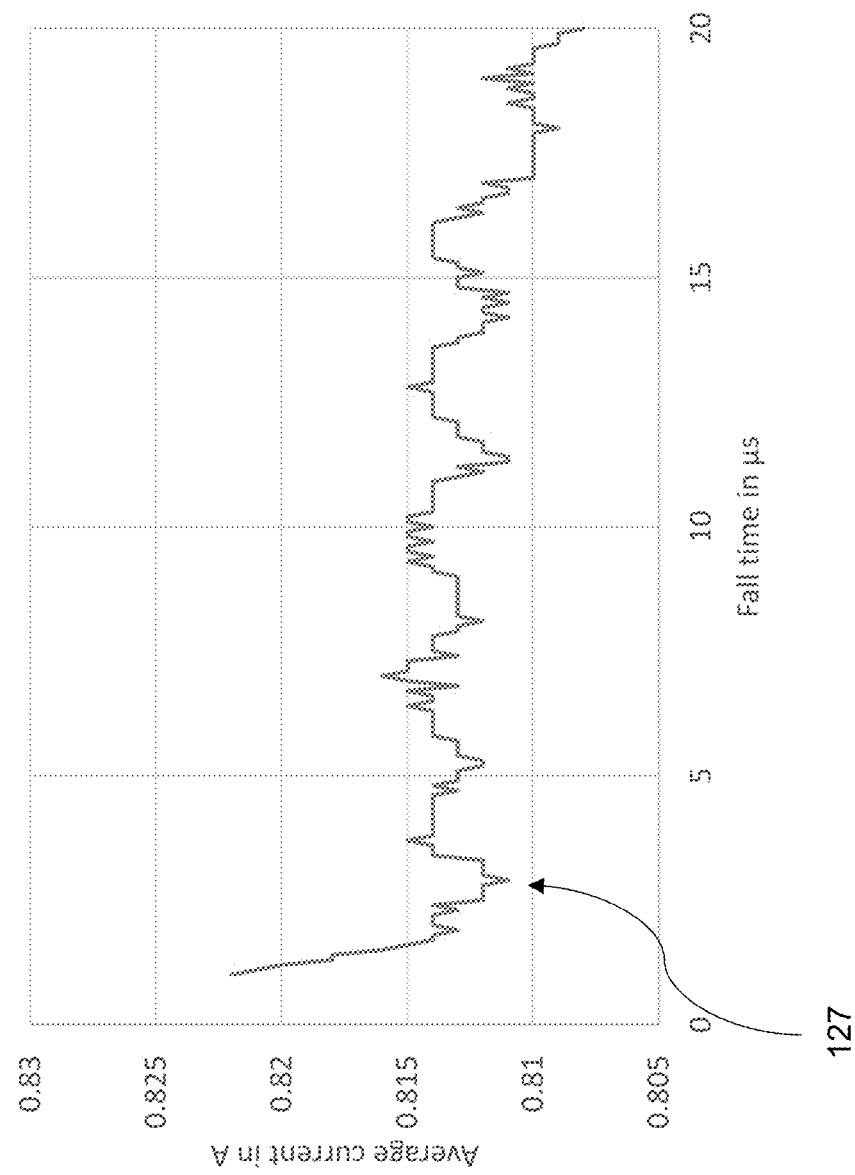
FIG. 4 shows a mean detected current value with varying fall time.

FIG. 4 shows an average detected current value with varying fall time of the voltage profile 107. In this case, the voltage profiles 107 have a constant waiting time of 2.3 µs and a constant rise time of 1 µs. The repetition rate is 15 kHz and the flow rate of the printing liquid is 14 ml/min.

The fall time of the voltage profile 107, on the other hand, is changed between 1 µs and 20 µs (X axis). Here, a predetermined voltage profile is used whose fall time is increased in small steps from the minimum value to the maximum value. For each fall time, the respective associated average current value flowing through the piezo element 103 is detected (Y-axis). Alternatively, the sound amplitude can also be determined with a microphone.

Subsequently, the voltage profile 107 with the fall time at which the average current value has a local minimum 127 is selected. This occurs at a fall time of 2.9 µs. This improves the drop shape. From this value, an efficient voltage profile 107 is possible. If the fall time falls below this value, an optimal action of the voltage profile 107 is not possible, because the speed of sound of the printing liquid is exceeded. The current measurement can also be referred to as power measurement because the voltage used is steady and constant, such as 24 V.

Figure 5:
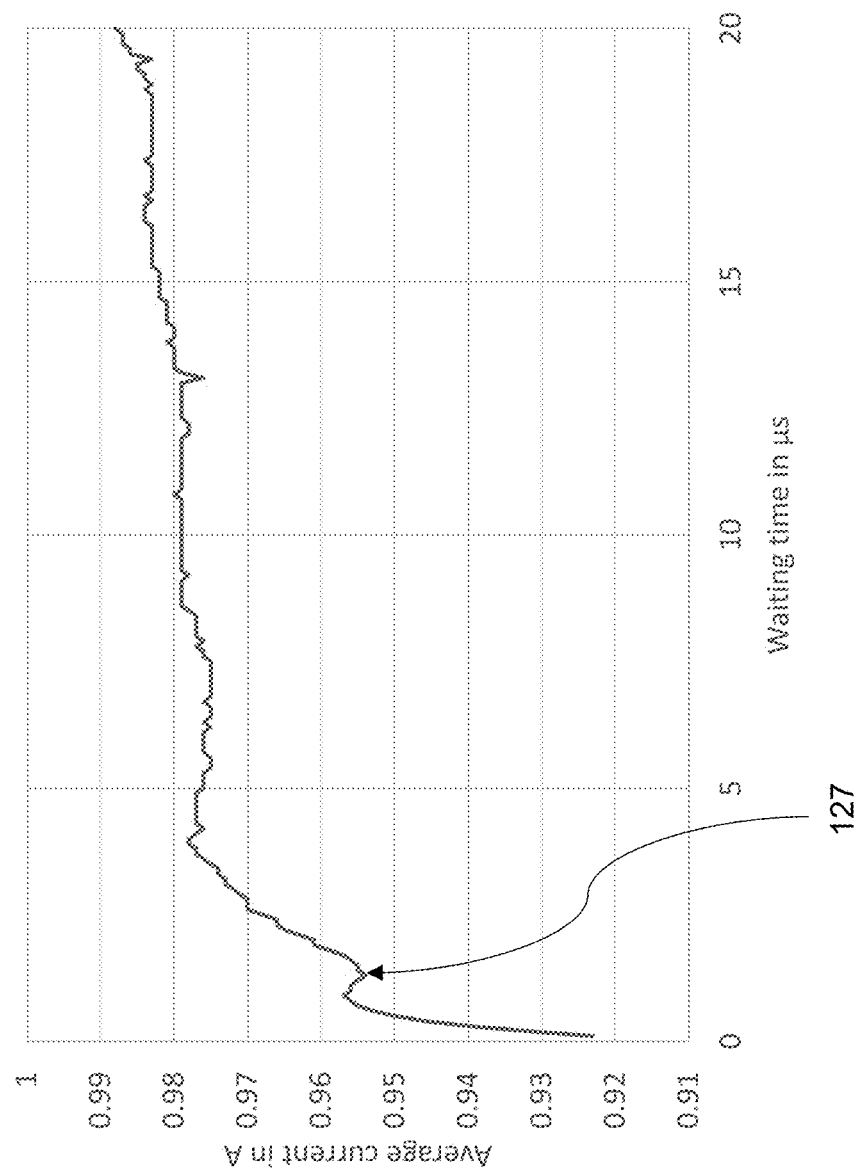
FIG. 5 shows a mean detected current value with varying waiting time.

FIG. 5 shows an average detected current value with varying waiting time of the voltage profile 107. The voltage profiles 107 have a constant fall time of 2.3 µs and constant rise time of 1 µs. The repetition rate is 20 kHz.

The waiting time of the voltage profile 107, on the other hand, is changed between 0 µs and 20 µs (X axis). Here, a predetermined voltage profile 107 is used, whose waiting time is increased in small steps from the minimum value to the maximum value. For each waiting time, the respective associated average current value flowing through the piezo element is detected (Y axis). Alternatively, the sound amplitude can also be determined with a microphone.

The curve has a local minimum 127 for the average current value at a waiting time of 1.3 µs. This point depends on the relaxation rate within the printing liquid 101. The local minimum 127 indicates the optimal time for the waiting time, since this is where the least amount of energy is used to generate the liquid drops 115. This means that the relaxation of the printing liquid is synchronous with the rise time.

Figure 6:
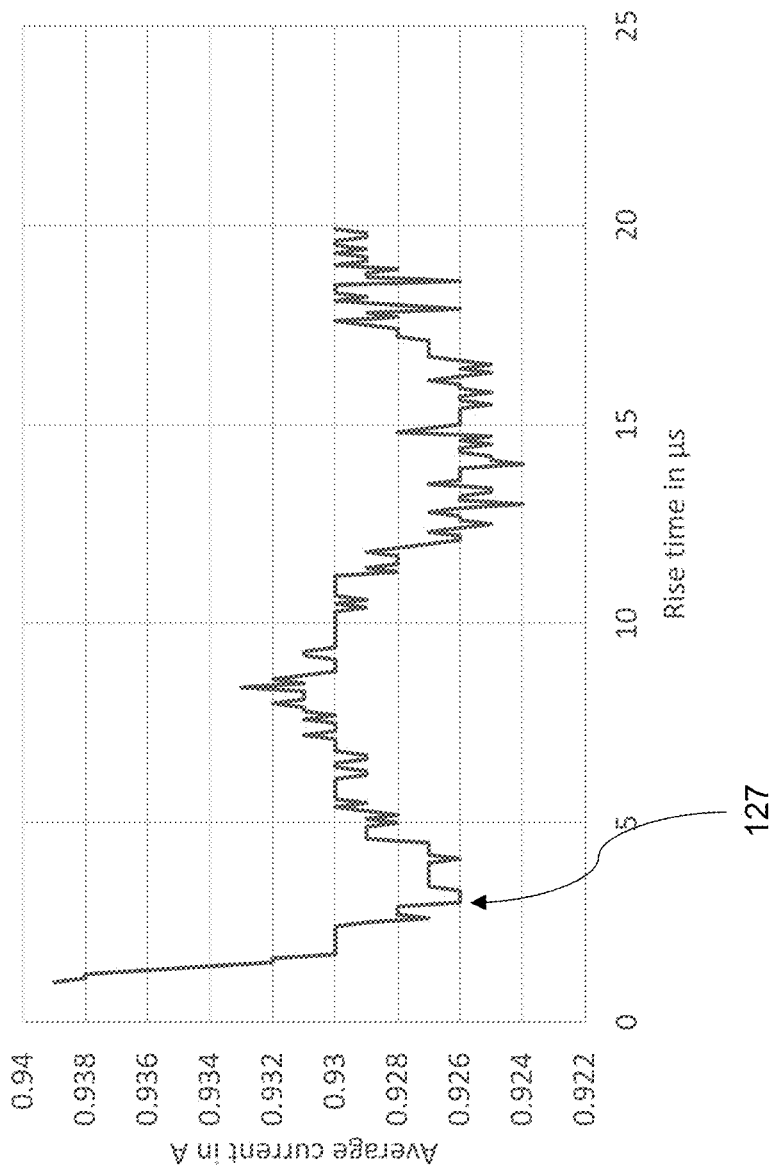
FIG. 6 shows a mean detected current value with varying rise time.

FIG. 6 shows an average detected current value with varying rise time of the voltage profile 107. The voltage profiles 107 have a constant fall time of 1 µs and a constant waiting time of 2.3 µs. The repetition rate is 15 kHz.

The rise time of the voltage profile 107, on the other hand, is changed between 1 µs and 20 µs (X axis). Here, a predetermined voltage profile 107 is used whose rise time is increased in small steps from the minimum value to the maximum value. For each rise time, the respective associated average current value flowing through the piezo element is detected (Y axis). Alternatively, the sound amplitude can also be determined with a microphone.

The curve has a local minimum 127 for the average current value at a rise time of 3.3 µs. The local minimum 127 indicates the optimum time for the rise time, since this is where the least amount of energy is used to generate the liquid drop 115. An efficient voltage profile 107 is possible from this value. If the rise time falls below this value, an optimal action of the voltage profile is not possible, because the speed of sound of the printing liquid 101 is exceeded.

Figure 7:
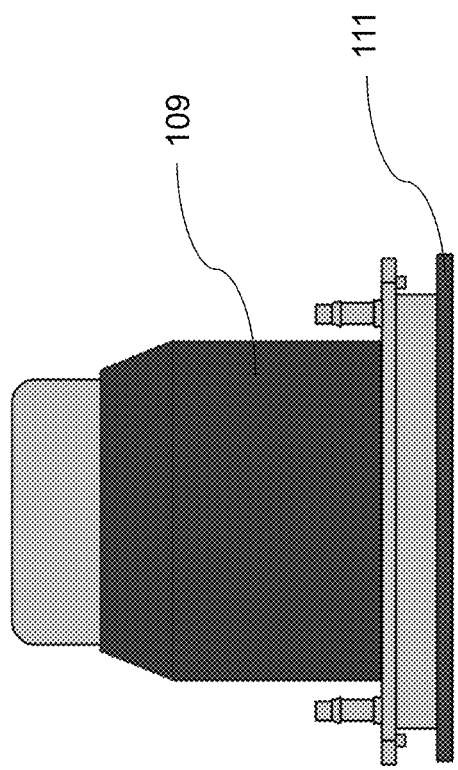
FIG. 7 shows a schematic view of a closure plate for a print head.

FIG. 7 shows a schematic view of a closure plate for the print head 109. The method can be performed with the printing nozzle 105 open or closed. A closure plate 111, which is attached to the print head 109, can be used to close the printing nozzle 105.

The relaxation time and the maximum fall and rise time can also be determined when measuring with the closure plate closed. If a displacement between open and closed closure plate is known, correction can be made with a correction value.

Figure 8:
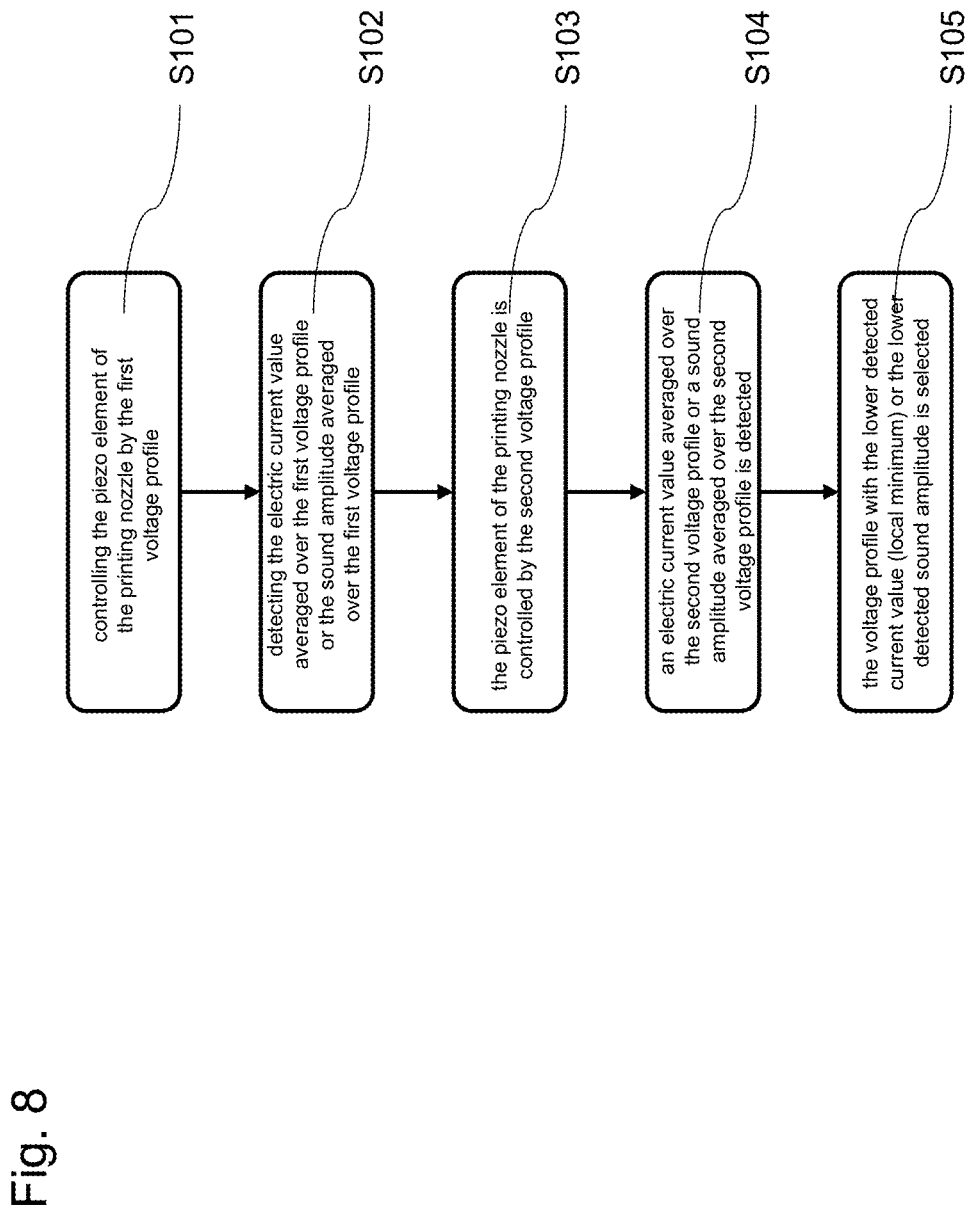
FIG. 8 shows a block diagram of a method for setting a drop shape.

FIG. 8 shows a block diagram of a method for adjusting a drop shape of a printing liquid. The method comprises the step S101 of controlling the piezo element 103 of the printing nozzle 105 by the first voltage profile 107, and the step S102 of detecting the electric current value averaged over the first voltage profile 107 or the sound amplitude averaged over the first voltage profile 107.

Then, in step S103, the piezo element 103 of the printing nozzle 105 is controlled by the second voltage profile 107, and in step S104, an electric current value averaged over the second voltage profile 107 or a sound amplitude averaged over the second voltage profile 107 is detected.

In step S105, the voltage profile 107 with the lower detected current value (local minimum 127) or the lower detected sound amplitude is selected. The method now offers the possibility to determine suitable voltage profiles for ejecting the printing liquid in a simple manner.

The steps can then be repeated to find another voltage profile with an even lower detected current value or sound amplitude. This means that a wide variety of voltage profiles 107 can be generated and the optimum values recorded in the process can be adopted independently by the system.

The method enables more cost-effective optimization and time savings of the drop shape, even when new printing liquids are used. Maintenance of the printing device is facilitated. Complex devices for determining the drop shape can be dispensed with, resulting in cost savings in the manufacture of the printing device.

The scanning and evaluation simplify the determination of an optimal voltage profile 107. For example, a printer control unit can independently determine an optimal voltage profile 107 (autotuning) without photographically recording the drops (drop watching). Adjustment of the voltage profile 107 may be necessary if a new printing liquid 101 is used or if the print head 109 or the printing liquid is subject to aging. This autotuning allows the printer control unit to readjust itself independently in these cases.

The method simplifies the setting of a drop shape. Furthermore, it is possible to elicit different parameters from the printing device 100 in order to take countermeasures automatically, if necessary. The values determined independently by the printing device 100 can be adopted by the print head control unit for automatic self-optimization or autotuning by an artificial intelligence.

All of the features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the features of the subject matter can be a method step of a method.

The scope of protection of the present invention is given by the claims and is not limited by the features explained in the description or shown in the figures.

REFERENCE LIST

100 Printing device or printer
101 Printing liquid
103 Piezo element
105 Printing nozzle
107 Voltage profile
109 Print head
111 Closure plate
113 Spatial object
115 Liquid drops 117 Ink chamber
119 Building platform
121 Start section
123 Hold section
125 End section
127 Local minimum

The invention claimed is:

1. A method for setting a drop shape in a printing process, comprising the steps of:
    controlling a piezo element of a printing nozzle by a first voltage profile;
    detecting an electric current value averaged over the first voltage profile or a sound amplitude averaged over the first voltage profile;
    controlling the piezo element of the printing nozzle by a second voltage profile;
    detecting an electric current value averaged over the second voltage profile or a sound amplitude averaged over the second voltage profile; and
    selecting the voltage profile with the lower detected current value or the lower detected sound amplitude.

2. The method as claimed in claim 1,
    wherein the second voltage profile is determined based on the first voltage profile.

3. The method as claimed in claim 1,
    wherein the second voltage profile is generated by decreasing or increasing a rise time of the first voltage profile.

4. The method as claimed in claim 1,
    wherein the second voltage profile is generated by decreasing or increasing a fall time of the first voltage profile.

5. The method as claimed in claim 1,
    wherein the second voltage profile is generated by decreasing or increasing a hold time of the first voltage profile.

6. The method as claimed in claim 1,
    wherein the second voltage profile (107) is generated by decreasing or increasing a holding voltage of the first voltage profile.

7. The method as claimed in claim 1,
    wherein the second voltage profile is generated by keeping a holding voltage of the first voltage profile unchanged.

8. The method as claimed in claim 1,
    wherein the second voltage profile is generated by keeping a hold time of the first voltage profile unchanged.

9. The method as claimed in claim 1,
    wherein the first voltage profile is a predetermined voltage profile.

10. The method as claimed in claim 1,
    wherein a plurality of predetermined voltage profiles is stored.

11. The method as claimed in claim 10,
    wherein the first and/or second voltage profile is selected from the plurality of predetermined voltage profiles.

12. The method as claimed in claim 1,
    wherein the method is performed when the printing liquid in the print head or printing system is changed or when a predetermined time has elapsed.

13. The method as claimed in claim 1,
    wherein the method is a three-dimensional printing method for building a spatial object.

14. The method as claimed in claim 1,
    wherein the print head is covered by a closure plate.

15. A printer configured to perform the method as claimed in claim 1.

* * * * *